(12) United States Patent
Fu et al.

(10) Patent No.: US 11,567,009 B1
(45) Date of Patent: Jan. 31, 2023

(54) METHOD FOR IDENTIFYING ORIGIN OF CHRYSANTHEMI FLOS

(71) Applicant: SOUTH-CENTRAL MINZU UNIVERSITY, Wuhan (CN)

(72) Inventors: Haiyan Fu, Wuhan (CN); Jian Yang, Beijing (CN); Xiaolong Yang, Chongqing (CN); Yuanbin She, Beijing (CN); Hengye Chen, Wuhan (CN); Wanjun Long, Yongzhou (CN); Shuo Wang, Wuhan (CN); Xueqing Zeng, Yichang (CN); Xiuyun Bai, Chongqing (CN)

(73) Assignee: SOUTH-CENTRAL MINZU UNIVERSITY, Wuhan (CN)

( * ) Notice: Subject to any disclaimer, the term of this patent is extended or adjusted under 35 U.S.C. 154(b) by 0 days.

(21) Appl. No.: 17/857,707

(22) Filed: Jul. 5, 2022

(30) Foreign Application Priority Data

Jul. 6, 2021 (CN) .......................... 202110761099.7

(51) Int. Cl.
G01N 21/64 (2006.01)
B82Y 15/00 (2011.01)
B82Y 40/00 (2011.01)

(52) U.S. Cl.
CPC ............ *G01N 21/643* (2013.01); *B82Y 15/00* (2013.01); *B82Y 40/00* (2013.01); *G01N 2021/6421* (2013.01); *G01N 2021/6432* (2013.01)

(58) Field of Classification Search
CPC ......... G01N 21/643; G01N 2021/6421; G01N 2021/6432; B82Y 15/00; B82Y 40/00
See application file for complete search history.

(56) References Cited

PUBLICATIONS

Liu et al., "Discrimination of different Chrysanthemums with Fourier transform infrared spectroscopy", 2008, Journal of Molecular Structure, 883-884, 38-47 (Year: 2008).*

Luo et al., "Fluorescence light up detection of aluminium ion and imaging in live cells based on the aggregation-induced emission enhancement of thiolated gold nanoclusters", 2019, Taianta, 204, 548-554 (Year: 2019).*

\* cited by examiner

*Primary Examiner* — Samuel P Siefke
*Assistant Examiner* — Henry H Nguyen
(74) *Attorney, Agent, or Firm* — WPAT, PC

(57) ABSTRACT

A method for identifying an origin of *Chrysanthemi flos* is provided, which belongs to the technical field of chemical analysis and detection, and comprises the following steps: mixing *Chrysanthemi flos* extract with aluminum ion solution, and gold nano-clusters (AuNCs) solution in a solvent, standing for reaction, detecting fluorescence intensity of *Chrysanthemi flos*, comparing the fluorescence intensity of *Chrysanthemi flos* to be detected with that of *Chrysanthemi flos* from a target origin, and determining whether they are from a same origin. According to the application, excited-state intramolecular proton transfer effect between 3-hydroxyflavone derivatives of *Chrysanthemi flos* and aluminum ions is utilized to enhance the fluorescence of 3-hydroxyflavone derivatives, where AuNCs combines aluminum ions to enhance aggregation-induced fluorescence, and reacts with flavonoids to quench their fluorescence; and visual characterization and traceability of *Chrysanthemum morifolium* quality are achieved by further comparing obvious rich fluorescence color changes before and after the reaction.

4 Claims, 5 Drawing Sheets

METHOD FOR IDENTIFYING ORIGIN OF CHRYSANTHEMI FLOS

CROSS-REFERENCE TO RELATED APPLICATIONS

The present application claims priority to Chinese Patent Application No. 202110761099.7, filed on Jul. 6, 2021, the contents of which are hereby incorporated by reference.

TECHNICAL FIELD

The present application relates to the technical field of chemical analysis and detection, and in particular to a method for identifying an origin of *Chrysanthemi flos*.

BACKGROUND

As one of the traditional Chinese herbs, *Chrysanthemi flos* (*Chrysanthemum morifolium* Ramat., Juhua in Chinese) boasts a wide range of varieties and origins across China, mainly categorized as Hangju, (a species of *Chrysanthemum morifolium* Ramat., produced in Tongxiang City, Zhejiang Province), Boju, Chuju, Gongju, Huaiju, Qiju, Jiju and Chuanju, etc. Among them, Hangju is of the best quality and is also one of the "Eight Herbs of Zhejiang", a famous local medicinal material. The best quality of Hangju owes much to its unique cultivars, favourable geographical and climatic conditions and mature production and processing techniques. Although seedlings thereof are the same, *Chrysanthemi flos* produced from different origins are indistinguishable to the naked eye, especially dried *Chrysanthemi flos* after processing; consequentially, differences in the quality of Hangju cannot be seen among them of different origins, such as the amount and types of active compounds they contain, resulting in a wide range of medicinal effects. Origin-based quality studies of Hangju or other Chinese herbs are usually carried out by chromatography and near-infrared spectroscopy, which are costly, difficult to operate and time-consuming; such methods are also confined to the laboratory and are not accessible to the general public, making them difficult to be popularized.

Therefore, it is of great practical importance to establish a method with high sensitivity, good specificity, low costs, fast and convenient visual characterization and traceability for the quality of Hangju derived from different origins.

SUMMARY

Based on the above, the present application provides a method for identifying an origin of *Chrysanthemi flos*, where excited-state intramolecular proton transfer effect (ESIPT) between 3-hydroxyflavone derivatives in *Chrysanthemi flos* and aluminum ions is utilized to enhance the fluorescence of 3-hydroxyflavone derivatives; besides, abilities of gold nano-clusters (AuNCs) combining with aluminum ions to produce aggregation-induced fluorescence enhancement (AIE) and reacting with flavonoids to quench their fluorescence are also adopted, and visual characterization and traceability of *Chrysanthemi flos* quality are achieved by comparing the visibly rich fluorescence colour changes before and after reaction; this environmental-friendly method has a simple process and can be easily popularized for industrial production owing to its low cost, it enables identification of *Chrysanthemi flos* origins by constructing a method based on 3-hydroxyflavone derivatives, which is then applied to *Chrysanthemi flos*.

One of the technical solutions of the application is a method for identifying origins of *Chrysanthemi flos*, which includes: preparing an extract of a *Chrysanthemi flos* to be detected; preparing an extract of a *Chrysanthemi flos* extract a target origin; preparing an AuNCs solution with orange fluorescence; uniformly mixing the extract of the *Chrysanthemi flos* to be detected, an aluminum ions solution, and the AuNCs solution in a solvent, standing for reaction, and detecting a fluorescence intensity of the *Chrysanthemi flos* to be detected after reaction; uniformly mixing the extract of the *Chrysanthemi flos* from the target origin, the aluminum ion solution and the AuNCs solution in a solvent, reacting, and detecting a fluorescence intensity of the *Chrysanthemi flos* from the target origin after reaction; comparing the fluorescence intensity of the *Chrysanthemi flos* to be detected with the fluorescence intensity of the *Chrysanthemi flos* from the target origin, and drawing a conclusion of whether these two *Chrysanthemi flos* are from a same origin.

In an embodiment, each of the preparing an extract of a *Chrysanthemi flos* to be detected and the preparing an extract of a *Chrysanthemi flos* from a target origin specifically includes: using a methanol aqueous solution as an extraction solvent, and performing ultrasonic extraction; and the preparing a AuNCs solution with orange fluorescence specifically includes: dropwise adding a chloroauric acid solution into a reduced glutathione solution under a stirring condition, then adjusting a pH value to be in a range of 4.5 to 5.5, followed by heating reaction in a dark environment under the stirring condition to obtain the AuNCs solution with orange fluorescence.

In an embodiment, each of the preparing an extract of a *Chrysanthemi flos* to be detected and the preparing an extract of a *Chrysanthemi flos* from the target origin specifically includes: crushing and grinding the *Chrysanthemi flos* and sieving the crushed and ground *Chrysanthemi flos* with a 50-mesh sieve to obtain *Chrysanthemi flos* powder, mixing the *Chrysanthemi flos* powder with the methanol water solution of 70% by volume according to a material-liquid ratio of 5 grams (g):1,000 milliliters (mL), performing the ultrasonic extraction at 40 degree Celsius (° C.) for 30 minute (min) to obtain a crude extract, centrifuging the crude extract at 8,000 revolutions per minute (rpm) for 10 min, and then taking supernatant to pass through a microporous filter membrane with a pore size of 0.22 micron (μm) to obtain a the extract of the *Chrysanthemi flos*; during the preparing a AuNCs solution with orange fluorescence: a mass fraction of chloroauric acid of the chloroauric acid solution is 1%, a concentration of reduced glutathione in the reduced glutathione solution is 0.001 g/mL, a molar ratio of the chloroauric acid and the reduced glutathione is in a range of 1:(1.4-1.6), and a pH value is adjusted to 5 with a sodium hydroxide solution with a concentration of 0.1 mol/L; the heating reaction in a dark environment under the stirring condition specifically includes: heating in the dark environment at 70° C. and 1,000 rpm for 20 hours (h), centrifuging at 8,000 rpm for 10 min, and then filtering supernatant with the microporous membrane with the pore size of 0.22 μm to obtain the AuNCs solution with orange fluorescence.

In an embodiment, a concentration of the AuNCs solution is in a range of 0.8 mg/mL to 6.4 mg/mL, a concentration of the aluminum ions solution is in a range of 1 millimole/liter (mmol/L)-20 mmol/L, and a mixing volume ratio of the extract of the *Chrysanthemi flos* to be detected:the aluminumion solution:the AuNCs solution is 100:50:50; and a duration of the standing for reaction is in a range of 2 min to 10 min; the solvent is ethanol; and the fluorescence intensity of the *Chrysanthemi flos* to be detected is under an emission wavelength of 380 nanometres (nm) to 650 nm, an excitation wavelength of 340 nm, and a slit width of 10 nm.

In a further technical solution of the present application, a method for producing a sensor for origin identification of *Chrysanthemi flos* is provided, including: preparing extracts of *Chrysanthemi flos* from different origins; preparing an AuNCs solution with orange fluorescence; mixing each of the extracts of *Chrysanthemi flos* from different origins with an aluminum ion solution and the AuNCs solution in a solvent, standing for reaction, and then detecting fluorescence color change of each of the *Chrysanthemi flos* from the different origins; converting the fluorescence color change of each of the *Chrysanthemi flos* from the different origins into red-green-blue (RGB) data; and constructing a reference color chart according to the RGB data and the different origins of the *Chrysanthemi flos*, and thereby obtaining the sensor for identifying an origin of *Chrysanthemi flos*.

In an embodiment, a smart phone is used for taking photos of fluorescence color change of *Chrysanthemi flos* extract before and after the reaction, and RGB data before and after the reaction are obtained by Photoshop matting, where the data is further modeled and analyzed in conjunction with chemometric methods to visualize the *Chrysanthemi flos* quality and trace origins.

In an embodiment, the extract of the *Chrysanthemi flos* is prepared by ultrasonic extraction with methanol aqueous solution as the extraction solvent.

The AuNCs solution with orange fluorescence is prepared as follows: dropwise adding a chloroauric acid solution into a reduced glutathione solution under a stirring condition, adjusting a pH value to a range of 4.5 to 5.5, and heating in a dark environment under the stirring condition to obtain the AuNCs solution with orange fluorescence.

In an embodiment, the extract of the *Chrysanthemi flos* is prepared specifically as follows: crushing and grinding the *Chrysanthemi flos* and sieving the crushed and ground *Chrysanthemi flos* with a 50-mesh sieve to obtain *Chrysanthemi flos* powder, mixing the *Chrysanthemi flos* powder with the methanol aqueous solution of 70% by volume at the ratio of 5 g:1,000 mL, performing the ultrasonic extraction at 40° C. for 30 min to obtain a crude extract, centrifuging the crude extract at 8,000 rpm for 10 min, and then taking supernatant to pass through a microporous membrane with a pore size of 0.22 μm to obtain the extract of the *Chrysanthemi flos*.

During the preparing a AuNCs solution with orange fluorescence: a mass fraction of chloroauric acid in the chloroauric acid solution is 1%, a concentration of reduced glutathione in the reduced glutathione solution is 0.001 g/mL, a molar ratio of the chloroauric acid and the reduced glutathione is in a range of 1:(1.4-1.6), and a sodium hydroxide solution with a concentration of 0.1 mol/L is used to adjust a pH value to 5; the heating in a dark environment under the condition stirring specifically includes: heating in the dark environment at 70° C. and 1,000 rpm for 20 h, centrifuging at 8,000 rpm for 10 min, and then filtering supernatant with the microporous membrane with the pore size of 0.22 μm to obtain the AuNCs solution with orange fluorescence.

In an embodiment, a concentration of the AuNCs solution is in a range of 0.8 to 6.4 mg/mL, a concentration of the aluminumion solution is in a range of 1 mmol/L to 20 mmol/L, a mixing volume ratio of the extract:the aluminum ion solution:the AuNCs solution is 100:50:50; and a duration of the standing for reaction is in a range of 2 min to 10 min; the solvent is ethanol; and the fluorescence intensity is detected under an emission wavelength of 380 nm to 650 nm, an excitation wavelength of 340 nm, and a slit width of 10 nm.

The principle of the application is that Al@AuNCs specifically recognizes flavonoids and competes with 3-hydroxyflavone derivatives for $Al^{3+}$ in a "turn-off/on" mode, in which AuNCs emit orange fluorescence, while aluminumion emit green fluorescence after reacting with 3-hydroxyflavone derivatives, where too high or too low a concentration of both reaction materials will result in a single fluorescence color change before and after the reaction with the *Chrysanthemi flos* extract, preventing a rapid and accurate identification; however, the concentration adopted in present application is an optimum concentration selected after experimental screening to enable an immediate and fast determining of *Chrysanthemi flos* origin, and the reaction is stable within 2-10 min.

A sensor for origin identification of *Chrysanthemi flos* is provided in a further technical solution according to the method above for preparing a sensor for identifying the origin of *Chrysanthemi flos* in present application.

A use of the sensor in origin identification of *Chrysanthemi flos* and/or detecting food and drug containing 3-hydroxy flavone derivatives is provided in a further technical solution of the present application.

The principle of the application is:

1. aluminium ions produce bright green fluorescence with 3-hydroxyflavonoid derivatives (e.g. kaempferol and quercetin, etc.) in *Chrysanthemi flos* through ESIPT; 2. aluminum ions combine with AuNCs to produce AIE, which leads to enhanced fluorescence; 3. AuNCs react with flavonoids (kaempferol, quercetin, apigenin, luteolin, etc.) in *Chrysanthemi flos* at the same time, and cause their fluorescence quenching; by producing a significantly richer fluorescence color change according to the three mechanisms described above, different degrees of fluorescence color differences are produced in *Chrysanthemi flos* of different origins, thus meeting the requirements for visual characterization and traceability of *Chrysanthemi flos* quality.

Compared with prior art, the present application has the advantages below:

the method of present application enables quality visual characterization and traceability of *Chrysanthemi flos* with superior stability, faster response, simpler operation and rather portable devices compared with other detection methods, and meets the requirements of ordinary people with broad application prospects and great potential in industrial production.

DETAILED DESCRIPTION OF EMBODIMENTS

Now various exemplary embodiments of the present application will be described in detail. This detailed description should not be taken as a limitation of the present application, but should be understood as a more detailed description of some aspects, characteristics and embodiments of the present application.

It should be understood that the terms mentioned in the present application are only used to describe specific embodiments, and are not used to limit the present application. In addition, for the numerical range in the present application, it should be understood that each intermediate data between the upper limit and the lower limit of the range is also specifically disclosed. Every smaller range between any stated data or the intermediate data within the stated range and any other stated data or the intermediate data within the stated range is also included in the present application. The upper and lower limits of these smaller ranges can be independently included or excluded from the range.

Unless otherwise stated, all technical and scientific terms used herein have the same meanings commonly understood by those of ordinary skill in the field to which this application relates. Although the present application only describes preferred methods and materials, any methods and materials similar or equivalent to those described herein can be used in the practice or testing of the present application. All documents mentioned in this specification are incorporated by reference to disclose and describe the methods and/or materials related to the documents. In case of conflict with any incorporated documents, the contents of this specification shall prevail.

Without departing from the scope or spirit of the present application, it is obvious to those skilled in the art that many modifications and changes can be made to the specific embodiments of the present specification. Other embodiments obtained from the description of the present application will be obvious to the skilled person. The specification and embodiment of this application are only exemplary.

As used in this application, the terms "comprising", "including", "having" and "containing" are all open terms, meaning including but not limited to.

Embodiment 1

Figure 1A:
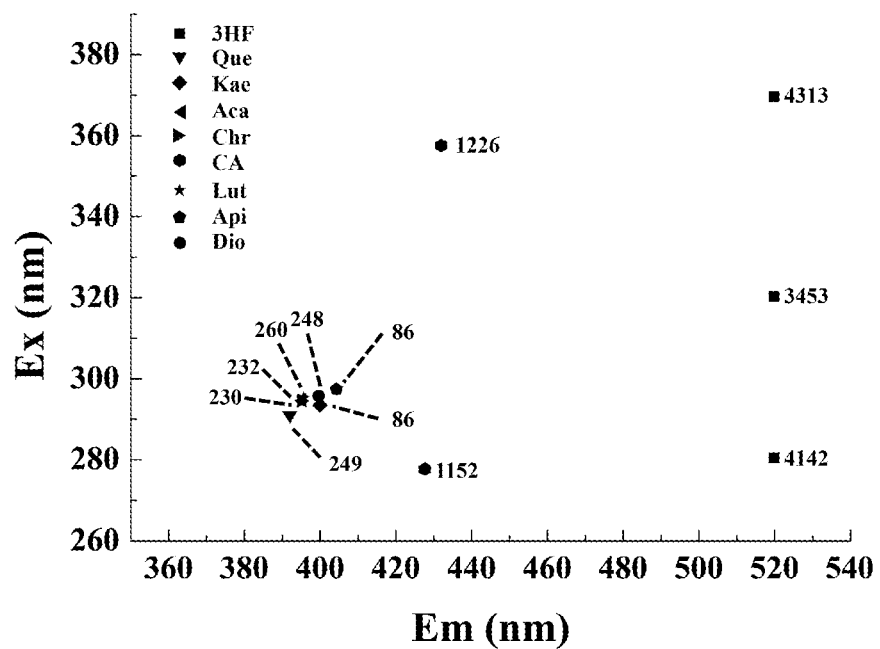
FIG. 1A shows a diagram of three-dimensional fluorescence before reaction of eight effective components of *Chrysanthemum morifolium* (Hangju) reference with aluminum ions in Embodiment 1 of the present application.
Figure 1B:
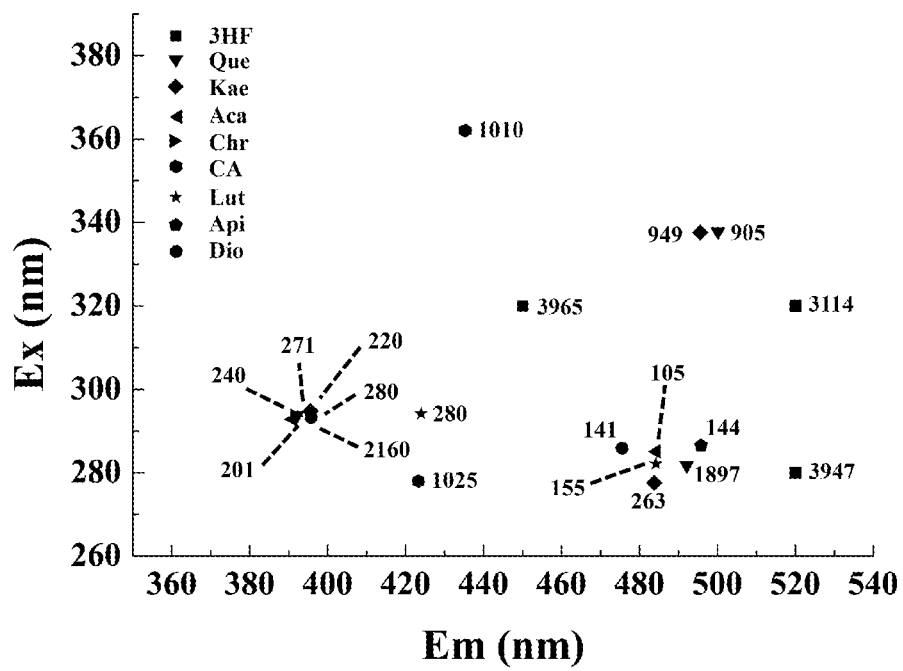
FIG. 1B shows a diagram of three-dimensional fluorescence after the reaction of eight effective components of Hangju reference with aluminum ions in Embodiment 1 of the present application.
Figure 2:
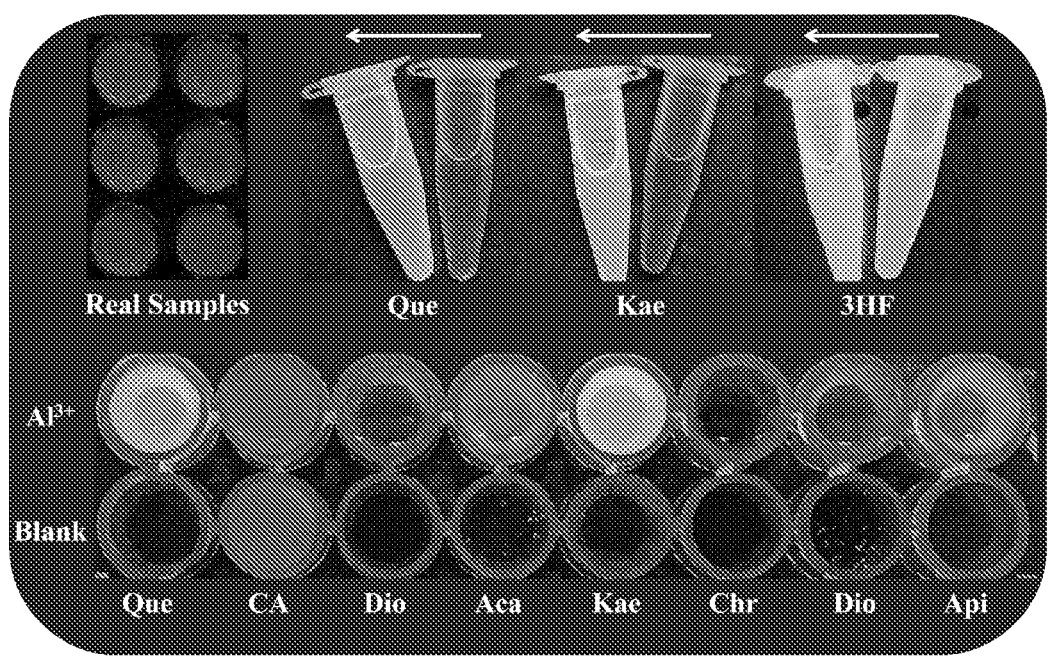
FIG. 2 shows a diagram of the reaction results before and after the reaction of eight effective components of Hangju reference and aluminum ions in Embodiment 1 of the present application.
Figure 3A:
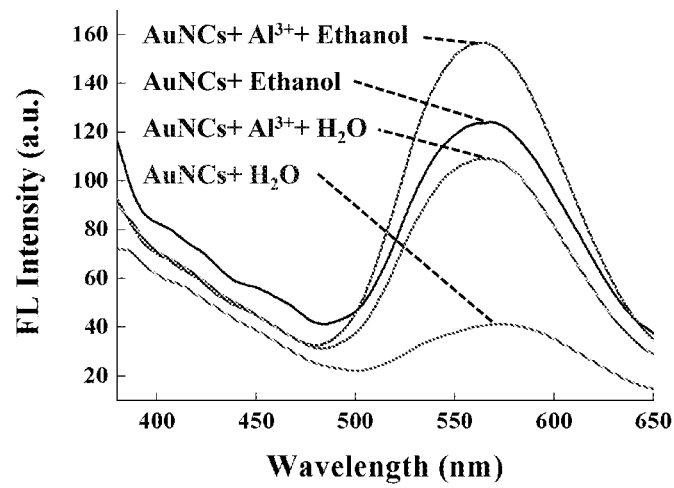
FIG. 3A shows influence of different solvents on fluorescence performance in Embodiment 1 of the present application.
Figure 3B:
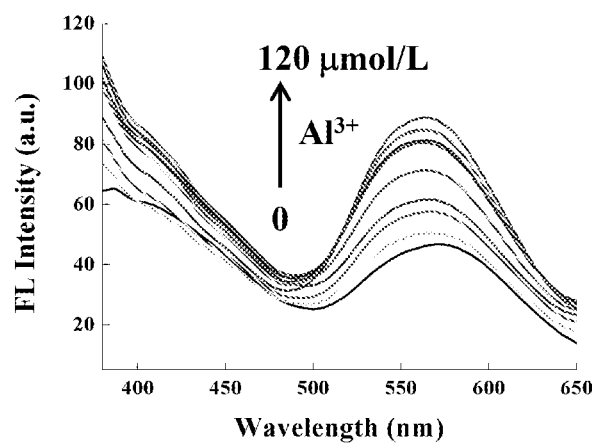
FIG. 3B shows influence of aluminum ions concentration on fluorescence performance in Embodiment 1 of the present application.
Figure 3C:
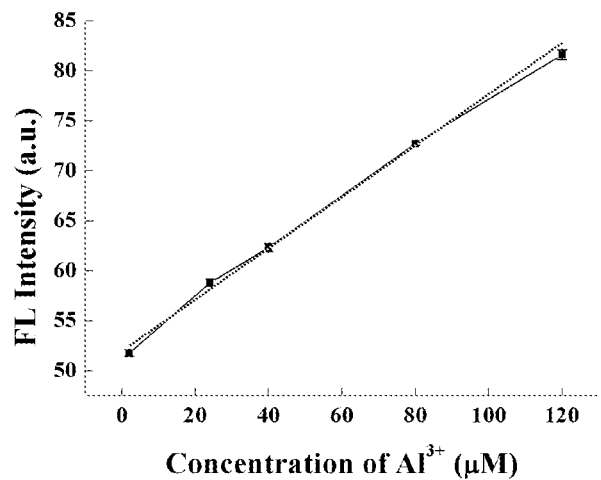
FIG. 3C shows linear range of fluorescence intensity after gold nano-clusters (AuNCs) reacts with different concentrations (in a range of 2-120 μmol/L) of $Al^{3+}$ in Embodiment 1 of the present application.

It is reported that main functional components contained in *Chrysanthemum morifolium* (Hangju) are 8 kinds of 3-hydroxyflavone derivatives, namely: quercetin, chlorogenic acid, geraniol, farnesin, kaempferol, coyne, luteolin and apigenin. To verify the fluorescence properties of the above components and aluminum ions, the reference samples of above components with the concentration of 0.4 mg/mL are taken for the following verification:

(1) mixing the above eight kinds of 3-hydroxyflavone derivatives according to the following concentrations: 100 microlitre (μL) of 3-hydroxyflavone derivatives+300 μL of absolute ethanol+50 μL of aluminum ions with a concentration of 10 mmol/L, mixing well, and observing three-dimensional fluorescence before and after reaction, where the results are shown in FIG. 1A and FIG. 1B, where A represents before and B stands for after the reaction; it can be seen from the figure that 3-hydroxyflavone derivatives experiences an obvious reaction and produce a new peak after aluminum ions are added; FIG. 2 shows reaction results, from which it can be seen that 3-hydroxyflavone changes from green to blue after reacting with aluminum ions, and quercetin and kaempferol change from quercetin and kaempferol, while other compounds have no obvious fluorescence color change;

(2) investigating the effects of different solvent systems and different aluminum ions concentrations on fluorescence intensity, where the specific process is as follows:

a. adding 0.092 gram (g) of a reduced glutathione to 92 milliliter (mL) of a ultrapure water solution, adding 8 mL of freshly prepared 1 percent (%) chloroauric acid dropwise under strong stirring, and adjusting a pH value of the solvent to about 5 with 0.1 mole per liter (mol/L) sodium hydroxide solution; heating the reaction mixture to 70° C., sealing in a dark environment, and gently stirring at 1,000 revolutions per minute (rpm) for 20 hours (h) to obtain a yellow clear solution; centrifuging the solution (8,000 rpm, 10 minutes (min)), taking the supernatant and filtering it with a 0.22 micron (mu) microporous membrane to remove large particles and insoluble impurities, thus obtaining a gold nano-clusters (AuNCs) solution;

b. adding 450 μL absolute ethanol or water, and 50 μL 6.4 mg/mL AuNCs prepared in step a into a 1.5 mL cuvette, reacting for 2 min, and detecting fluorescence performance;

c. adding 400 μL absolute ethanol or water, 50 μL 20 mmol/L aluminum ions, and 50 μL 6.4 mg/mL AuNCs prepared in step a into a 1.5 mL cuvette, reacting for 2 min, and detecting fluorescence performance; and d. adding 220 μL of water, 50 μL of 70% methanol, 50 μL of 6.4 mg/mL of AuNCs solution prepared in step a and 80 μL of $Al^{3+}$ with concentrations of 0, 0.01, 0.1, 0.2, 0.4, 0.6, 1, 3, 5 and 10 mmol/mL, respectively, into a 1.5 mL cuvette, reacting for 2 min; results show that the fluorescence intensity of AuNCs gradually increases with the increase of concentration of $Al^{3+}$ and shows a good linear relationship in the range of 0.01-0.6 mmol/mL (the actual concentration after addition is 2-120 μmol/mL);

referring FIG. 3A to FIG. 3C for specific results, where FIG. 3A shows the influence of different solvents on the fluorescence performance, FIG. 3B shows the influence of aluminum ions concentration on the fluorescence performance of AuNCs, and FIG. 3C shows the linear range of fluorescence intensity after AuNCs reacts with different concentrations (2-120 μmol/L) of $Al^{3+}$; it can be seen from FIG. 3A that the fluorescence intensity of AuNCs after responding with aluminum ions in ethanol is higher, which lays a foundation for the following visual characterization and traceability of Hangju quality. FIGS. 3B to 3C further illustrate that the fluorescence intensity of AuNCs gradually enhances with the increase of $Al^{3+}$ concentration, and shows a good linear relationship in a certain concentration range (2 to 120 µmol/L);

(3) the effects of nano-clusters on fluorescence properties are investigated specifically as follows:

silver nano-clusters (AgNCs) and copper nano-clusters (CuNCs) are prepared by replacing chloroauric acid in AuNCs with silver nitrate and copper sulfate with equal molar mass, and other steps are the same as preparing AuNCs.

Figure 4:
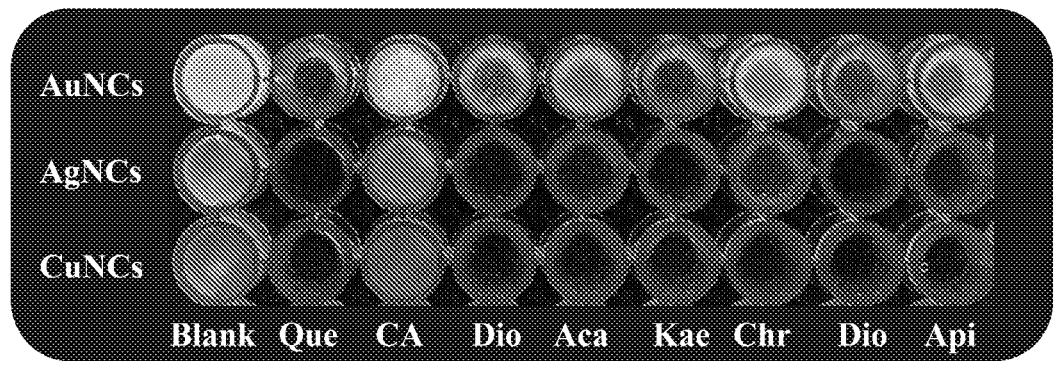
FIG. 4 shows the influence of nano-clusters on the fluorescence properties of 3-hydroxyflavone derivatives in Embodiment 1 of the present application.

AuNCs, AgNCs and CuNCs react with eight reference substances (0.4 mg/mL) respectively, and the results are shown in FIG. 4. It can be seen from the drawing that flavonoids in Hangju have a good response to AuNCs with their fluorescence intensity being quenched to different degrees, which lays a foundation for the following visual characterization and traceability of Hangju quality. However, the other two nanomaterials show no obvious response to different kinds of reference materials in Hangju and are therefore not considered as candidates. From left to right in FIG. 4, 1-8 represents quercetin, chlorogenic acid, geraniol, farnesin, kaempferol, coyne, luteolin and apigenin respectively, with a concentration of 0.5 mg/mL.

Embodiment 2

Figure 5:
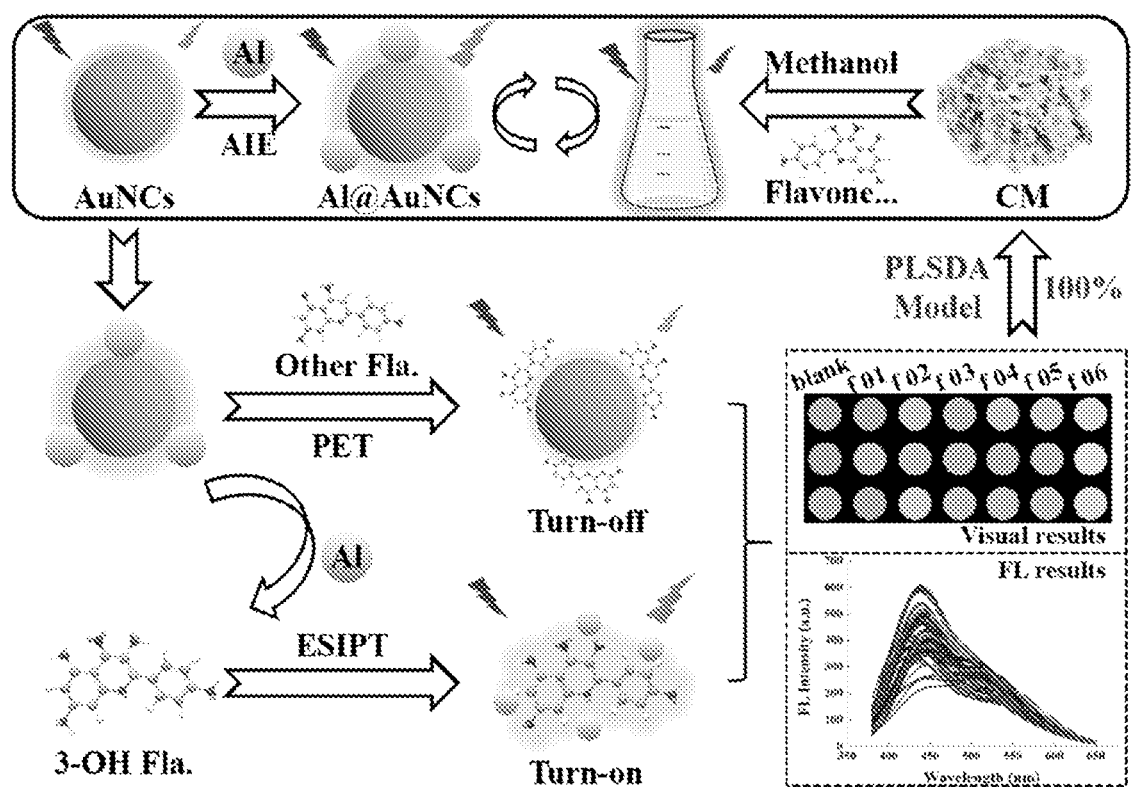
FIG. 5 illustrates a processing of the identifying origin of Hangju in Embodiment 2 of the present application.
Figure 6:
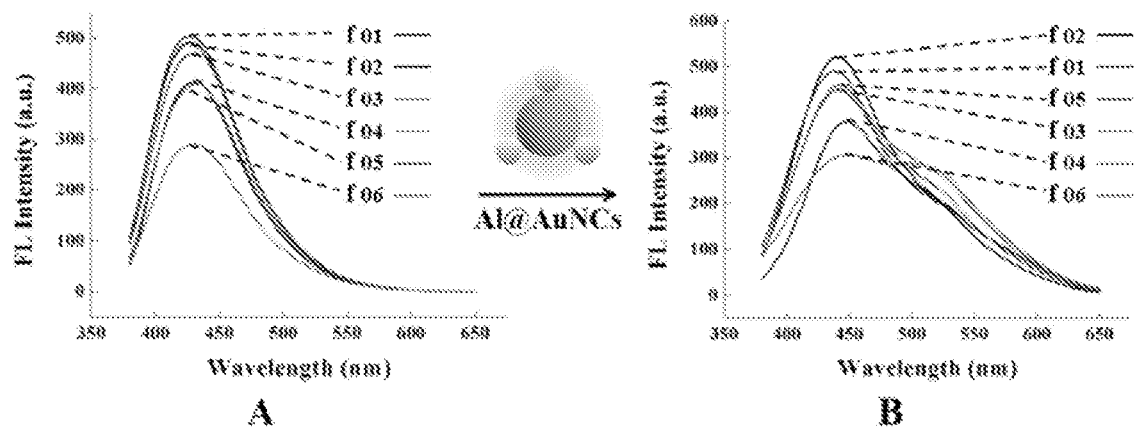
FIG. 6 shows the fluorescence spectra of Hangju extract from different origins before (A) and after (B) reaction with aluminum ions and AuNCs in Embodiment 2 of the present application.
Figure 7:
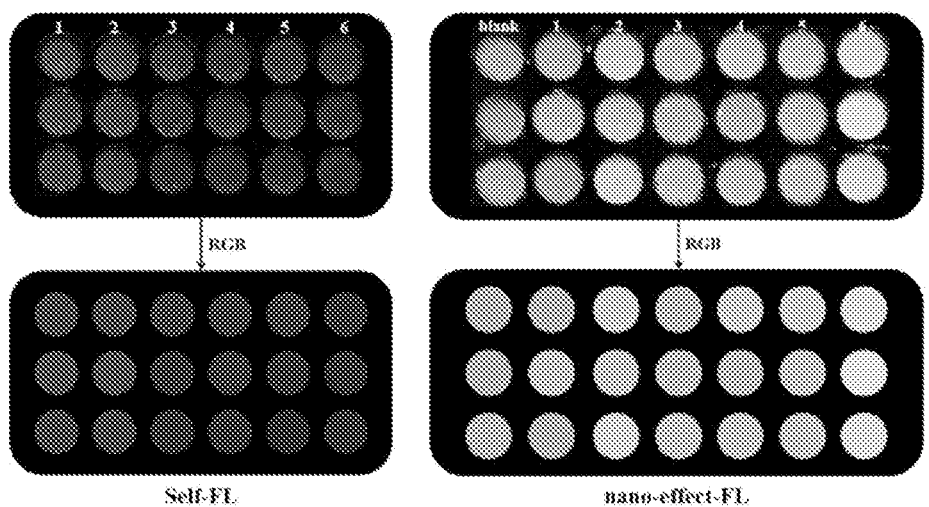
FIG. 7 shows the visual characterization results before and after reaction of Hangju extract with aluminum ions and AuNCs in Embodiment 2 of the present application, where the left picture shows the fluorescence visual characterization of Hangju before reaction, and the right picture shows the fluorescence visual characterization of Hangju after reaction.

A method for identifying an origin of Hangju as shown in FIG. 5 has processing as follows:

(1) crushing and grinding Hangju from six different origins, and sieving the crushed and ground Hangju with a 50-mesh sieve to obtain Hangju sample powders (the origins of Hangju from six different origins are No. 1 form Sheyang County, Yancheng, Jiangsu Province, No. 2 from Rudong County, Nantong, Jiangsu Province, No. 3 from Tongxiang City, Jiaxing, Zhejiang Province, No. 4 from Wuyi County, Jinhua, Zhejiang Province, No. 5 from Jiangchang Town, Tianmen, Hubei Province, and No. 6 from Huangtan Town, Tianmen, Hubei Province); weighing six Hangju sample powders respectively and adding into 6 parts of 10 mL of 70% methanol aqueous solution, macerating for 5 min and putting into a sonicator for 30 min at 40° C., then using a methanol aqueous solution of 70% by volume to make up the volume to 10 mL; centrifuging the crude extract at 8,000 rpm for 10 min, and filtering the supernatant through a microporous membrane with a pore size of 0.22 µm to obtain methanol extracts of Hangju from six different origins;

(2) adding 0.092 g of reduced glutathione into 92 mL of ultrapure water solution, adding 8 mL 1% of freshly prepared 1% chloroauric acid dropwise under strong stirring, and adjusting the pH of the solvent to about 5 with 0.1 mol/L sodium hydroxide solution; heating the reaction mixture to 70° C., sealing in the dark, and gently stirring at 1,000 rpm for 20 h to obtain a yellow clear solution; centrifuging the solution (8,000 rpm, 10 min), taking supernatant and filtering it with a 0.22 µm microporous membrane to remove large particles and insoluble impurities, thus obtaining a AuNCs solution, and storing it in a refrigerator at 4° C. for later use;

(3) adding 100 µL of each of the extracts of Hangju from different origins prepared in step (1) with a concentration of 6.4 mg/mL, 300 µL of absolute ethanol, 50 µL of 20 mmol/L aluminum ions, and 50 µL of 6.4 mg/mL of AuNCs prepared in step (2) into six 1.5 mL cuvettes, and reacting for 2 min;

(4) setting excitation wavelength at 340 nm, and measuring fluorescence spectrum at 380-650 nm to obtain fluorescence spectrum data of Hangju from different origins before and after the reaction; FIG. 6 shows the results of fluorescence spectra of a single batch of Hangju from different origins before (A) and after (B) reacting with Al@AuNCs, where Hangju from different origins show little difference before adding aluminum ions and AuNCs, and they are indistinguishable for showing similar peak positions, while peak positions change and redshift can be seen after aluminum ions and AuNCs are added, different Hangju from different origins can hence be clearly distinguished;

(5) taking a 96 microplate with a pore diameter of 400 µL, and accurately measuring 100 µL of the extract of each of the Hangju prepared in step (1), 200 µL of absolute ethanol, 50 µL of aluminum ions with a concentration of 20 mmol/L, and 50 µL of AuNCs solution prepared in step (2) with a pipette; using a smartphone (IPHONE XR produced by Apple Inc.) to take photos of the fluorescence color change of Hangju before and after the reaction under excitation light of 365 nm in a ultraviolet dark box, converting obtained fluorescence color change of Hangju from different origins into RGB data, as shown in FIG. 7, where left picture shows the self-fluorescence visual characterization of Hangju before the reaction, and the right picture shows the fluorescence visual characterization of Hangju after the reaction; it can be seen that Hangju from different origins have very similar original fluorescence and are difficult to distinguish, while obvious fluorescence color change occurs after reacting with aluminum ions and AuNCs, and rich and obvious fluorescence color difference exists between Hangju from different origins, making it easy to distinguish.

The above are only preferred embodiments of the present application, and are not intended to limit the present application. Any modification, equivalent substitution and improvement made within the spirit and principle of the present application should be included in the scope of protection of the present application.

What is claimed is:

1. A method for identifying an origin of *Chrysanthemi flos*, comprising: preparing an extract of a *Chrysanthemi flos* to be detected;

preparing an extract of a *Chrysanthemi flos* from a target origin;

preparing a gold nano-clusters (AuNCs) solution with orange fluorescence;

uniformly mixing the extract of the *Chrysanthemi flos* to be detected, an aluminum ion solution and the AuNCs solution in a solvent, standing for reaction, detecting a fluorescence intensity of the *Chrysanthemi flos* to be detected after the reaction, taking photos of fluorescence color change before and after the reaction, obtaining fluorescence color change according to the photos of fluorescence color change before and after the reaction, and converting the obtained fluorescence color change into red-green-blue (RGB) data;

uniformly mixing the extract of the *Chrysanthemi flos* from the target origin, the aluminum ion solution and the AuNCs solution in a solvent, reacting, detecting a fluorescence intensity of the *Chrysanthemi flos* from the target origin after the reacting, taking photos of fluorescence color change before and after the reacting, acquiring fluorescence color change according to the photos of fluorescence color change before and after the reacting, and converting the acquired fluorescence color change into RGB data; and comparing the RGB data of the *Chrysanthemi flos* to be detected with the RGB data of the *Chrysanthemi flos* from the target origin, and thereby identifying the origin of the *Chrysanthemi flos* to be detected.

2. The method for identifying the origin of *Chrysanthemi flos* according to claim 1,
wherein each of the preparing an extract of a *Chrysanthemi flos* to be detected and the preparing an extract of a *Chrysanthemi flos* from a target origin specifically comprises:
using a methanol aqueous solution as an extraction solvent, and performing ultrasonic extraction; and
wherein the preparing an AuNCs solution with orange fluorescence specifically comprises:
dropwise adding a chloroauric acid solution into a reduced glutathione solution under a stirring condition, then adjusting a pH value to be in a range of 4.5 to 5.5, and heating in a dark environment under the stirring condition to obtain the AuNCs solution with orange fluorescence.

3. The method for identifying the origin of *Chrysanthemi flos* according to claim 2,
wherein each of the preparing an extract of a *Chrysanthemi flos* to be detected and the preparing an extract of a *Chrysanthemi flos* from a target origin specifically comprises:
crushing and grinding the *Chrysanthemi flos* and sieving the crushed and ground *Chrysanthemi flos* with a 50-mesh sieve to obtain *Chrysanthemi flos* powder, mixing the *Chrysanthemi flos* powder with the methanol aqueous solution of 70% by volume according to a material-liquid ratio of 5 grams (g): 1,000 milliliters (mL), then performing the ultrasonic extraction at 40 degree Celsius (° C.) for 30 minutes (min) to obtain a crude extract, centrifuging the crude extract at 8,000 revolutions per minute (rpm) for 10 min, and then taking supernatant to pass through a microporous membrane with a pore size of 0.22 microns (μm) to obtain the extract of the *Chrysanthemi flos*;
wherein during the preparing an AuNCs solution with orange fluorescence:
a mass fraction of chloroauric acid in the chloroauric acid solution is 1%, a concentration of reduced glutathione in the reduced glutathione solution is 0.001 g/mL, and a molar ratio of the chloroauric acid to the reduced glutathione is in a range of 1: (1.4-1.6); a sodium hydroxide solution with a concentration of 0.1 mol/L is used to adjust a pH value to 5; and
wherein the heating in a dark environment under the stirring condition specifically comprises:
heating in the dark environment at 70° C. and 1,000 rpm for 20 hours (h), centrifuging at 8,000 rpm for 10 min, and then filtering supernatant with the microporous membrane with the pore size of 0.22 μm to obtain the AuNCs solution with orange fluorescence.

4. The method for identifying the origin of *Chrysanthemi flos* according to claim 1,
wherein a concentration of the AuNCs solution is in a range of 0.8 mg/mL to 6.4 mg/mL, a concentration of the aluminum ion solution is in a range of 1 millimole/liter (mmol/L)-20 mmol/L, and a mixing volume ratio of the extract of the *Chrysanthemi flos* to be detected: the aluminum ion solution:the AuNCs solution is 100: 50:50; and a duration of the standing for reaction is in a range of 2 min to 10 min;
wherein the solvent is ethanol; and
wherein the fluorescence intensity of the *Chrysanthemi flos* to be detected is under an emission wavelength of 380 nanometres (nm) to 650 nm, an excitation wavelength of 340 nm, and a slit width of 10 nm.

\* \* \* \* \*